Oct. 6, 1936.　　　S. P. WORDEN　　　2,056,497
URINE TESTING DEVICE
Filed July 6, 1935　　　7 Sheets-Sheet 1

Sam P. Worden　Inventor

By Jesse R. Stone & Lister B. Clark
Attorneys

Oct. 6, 1936.     S. P. WORDEN     2,056,497
URINE TESTING DEVICE
Filed July 6, 1935     7 Sheets-Sheet 2

Sam P. Worden, Inventor

By Jesse R. Stone & Lester B. Clark, Attorneys

Oct. 6, 1936.   S. P. WORDEN   2,056,497
URINE TESTING DEVICE
Filed July 6, 1935   7 Sheets-Sheet 3

Sam P. Worden   Inventor.

By   Jesse R. Stone
     Lester B. Clark
                        Attorneys

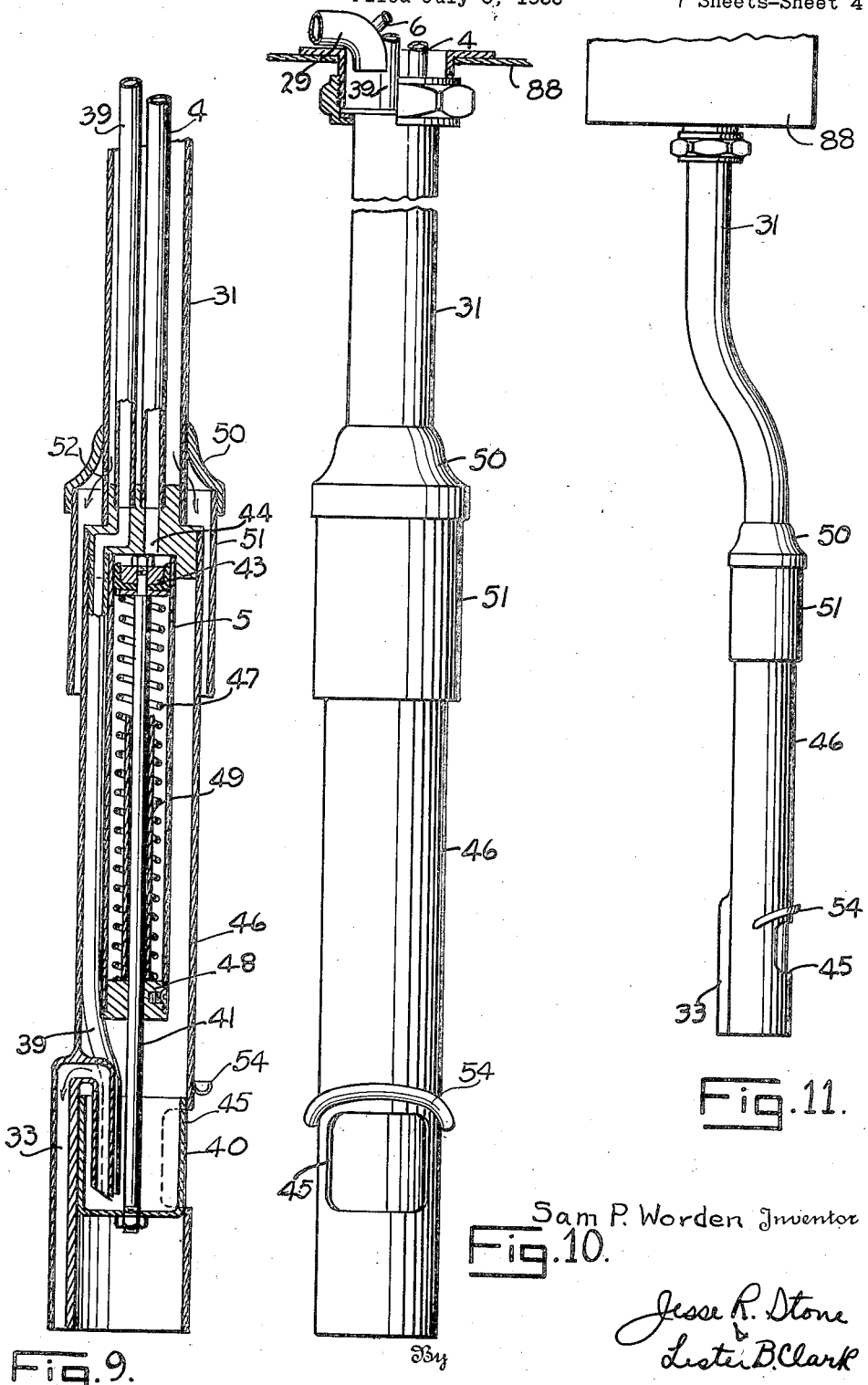

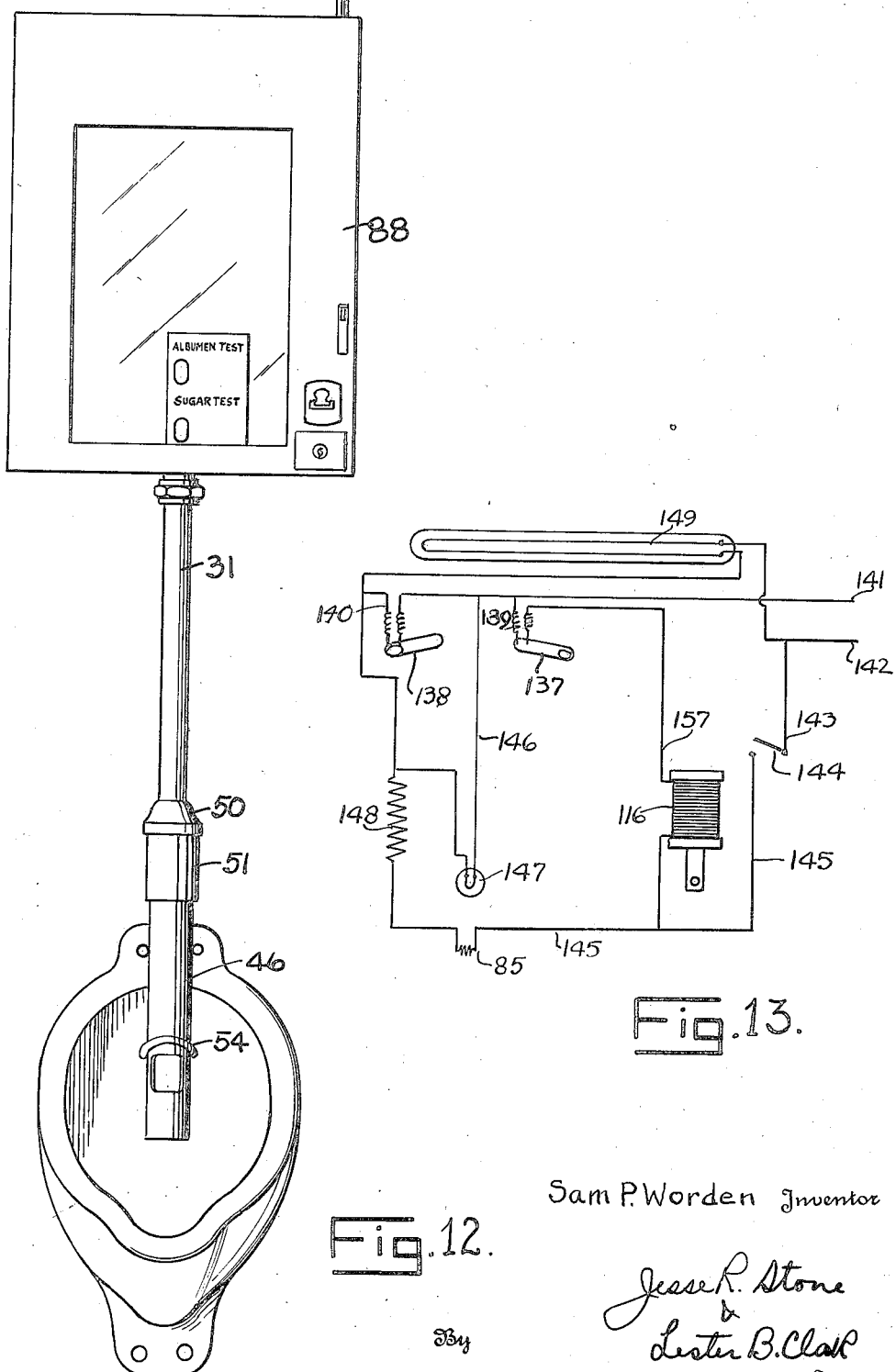

Oct. 6, 1936.   S. P. WORDEN   2,056,497
URINE TESTING DEVICE
Filed July 6, 1935   7 Sheets-Sheet 6

Sam P. Worden
Inventor

By Jesse R. Stone
& Lester B. Clark
Attorneys

Oct. 6, 1936.                 S. P. WORDEN                 2,056,497
                           URINE TESTING DEVICE
              Filed July 6, 1935              7 Sheets-Sheet 7

Sam P. Worden   Inventor

Jesse B. Stone
Lister B. Clark

By

Attorneys

Patented Oct. 6, 1936

2,056,497

UNITED STATES PATENT OFFICE 2,056,497

URINE TESTING DEVICE

Sam P. Worden, Houston, Tex., assignor of two-thirds to J. B. Rushing, Hemphill, and one-third to J. P. Barnes, Houston, Tex.

Application July 6, 1935, Serial No. 30,087

18 Claims. (Cl. 23—253)

The invention relates to an apparatus for making tests of urine to determine the presence therein of albumin or sugar.

The device is an improvement upon the apparatus disclosed in patent to Heaps, et al., No. 1,979,038, of October 30, 1934.

The invention has for its object the provision of a device which is largely automatic in operation and which will make a proper and visible test of urine and wherein the operator has nothing to do except to move a lever.

The present object is to provide an improved type of apparatus of this character which may be comparatively cheaply made and which will not tend to get out of order in use.

I desire to provide an apparatus which will operate reliably under ordinary working conditions and which is not subject to excessive wear or breakage.

It is a further object of the invention to provide an improved apparatus which is capable of operation through a coin control mechanism and wherein the device is made approximately fool proof so that no errors in the operation of the device will occur.

In the drawings herewith the construction of my improved apparatus is shown.

Fig. 9 is a central longitudinal section through the urine receptacle and its operating parts.

Fig. 10 is a front elevation of said receptacle.

Fig. 11 is a side elevation of the said receptacle.

Fig. 12 is a front elevation of the housing with the receptacle and tube connected therewith.

Fig. 13 is a schematic view showing the wiring for the electrical parts of the device.

Figure 14:
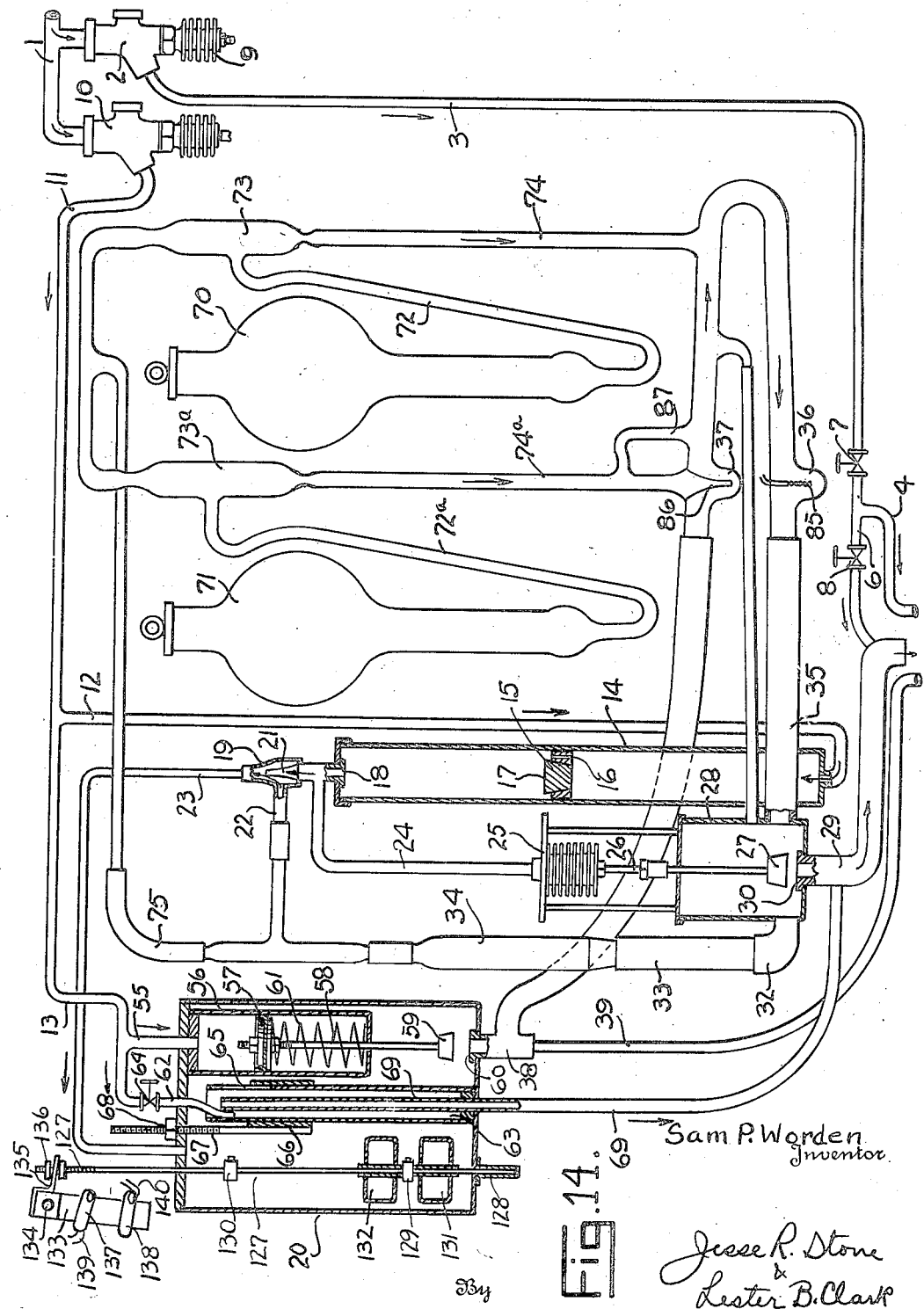
Fig. 14 is a diagrammatic view in which the parts shown in Fig. 1 have been separated and certain parts broken away for greater clearness in the understanding of the device.

Referring particularly to Fig. 14 wherein my device is somewhat diagrammatically arranged, I have shown the apparatus as connected up with a water line 1, which is to be understood as forming a part of a water pressure system such as the water main connected with the usual water service of cities. This pipe leads by way of the valve 2 to a water conducting pipe 3, which has branches toward the lower end, one of them, 4, leading to a cylinder 5, shown in Fig. 9, for operating the urine receptacle. The other branch, 6, leads to the drain connected with the sewer. There are valves 7 and 8 in this line, as seen in Fig. 14, which may control the amount of flow through the pipes as desired, the valve 8 being normally closed.

The valve 2 is to be understood as an ordinary pressure operated valve. The stem projects into the lower resilient bellows or sylphon element 9. This valve opens by an upward thrust from below, as will be noted, to allow the flow of fluid therethrough, but is adapted to close when the thrust is removed.

The other valve shown at 10 is a valve of similar construction which operates by connection with a lever, later described, to open and allow the flow of fluid therethrough to the pipe 11, which has branches 12 and 13.

The branch 12 conducts water to the lower end of a cylinder 14, said cylinder having therein a loose piston 15 with fluid passages 16 therethrough. The central portion of the piston forms a valve at 17, which, when moved to the upper end of the cylinder, will close off the outlet 18. The flow of fluid through the cylinder 14 will cause the outflow of liquid above the piston and a certain amount of water will flow from below through the passages 16 and find an outlet at the upper end of the cylinder. The capacity of the cylinder 14 is predetermined so that the volume of water discharged during the movement of the piston 15 from the lower to the upper end thereof will be sufficient to operate the aspirator or injector 19 above the same and furnish the desired suction for operation of connected devices, as will be explained.

The water flowing from the cylinder 14 through the outlet 18 passes through an aspirator nozzle 21 and through the tapered end thereof reduces the atmospheric pressure in the housing 19 of the aspirator, as noted. The suction of the aspirator will cause an inflow through the pipe 22 connected with the housing of the injector. Water passing the injector will find passage through a connecting pipe 23 to the upper end of the control housing 20.

Part of the liquid in the cylinder 14 passing through the outlet 18 will flow through the pipe 24 to the expansion chamber formed by the sylphon element 25. The lower end of this element is connected by means of the valve rod 26 to the valve 27. The valve rod has a loose sliding connection through the upper end of a fluid-receiving chamber 28, allowing a vent when the valve is open. A packing sleeve 26a on the rod is compressed against the chamber 28 when the valve is closed to seal about the rod at that time and preserve a closure at the upper end of the chamber.

Figure 1:
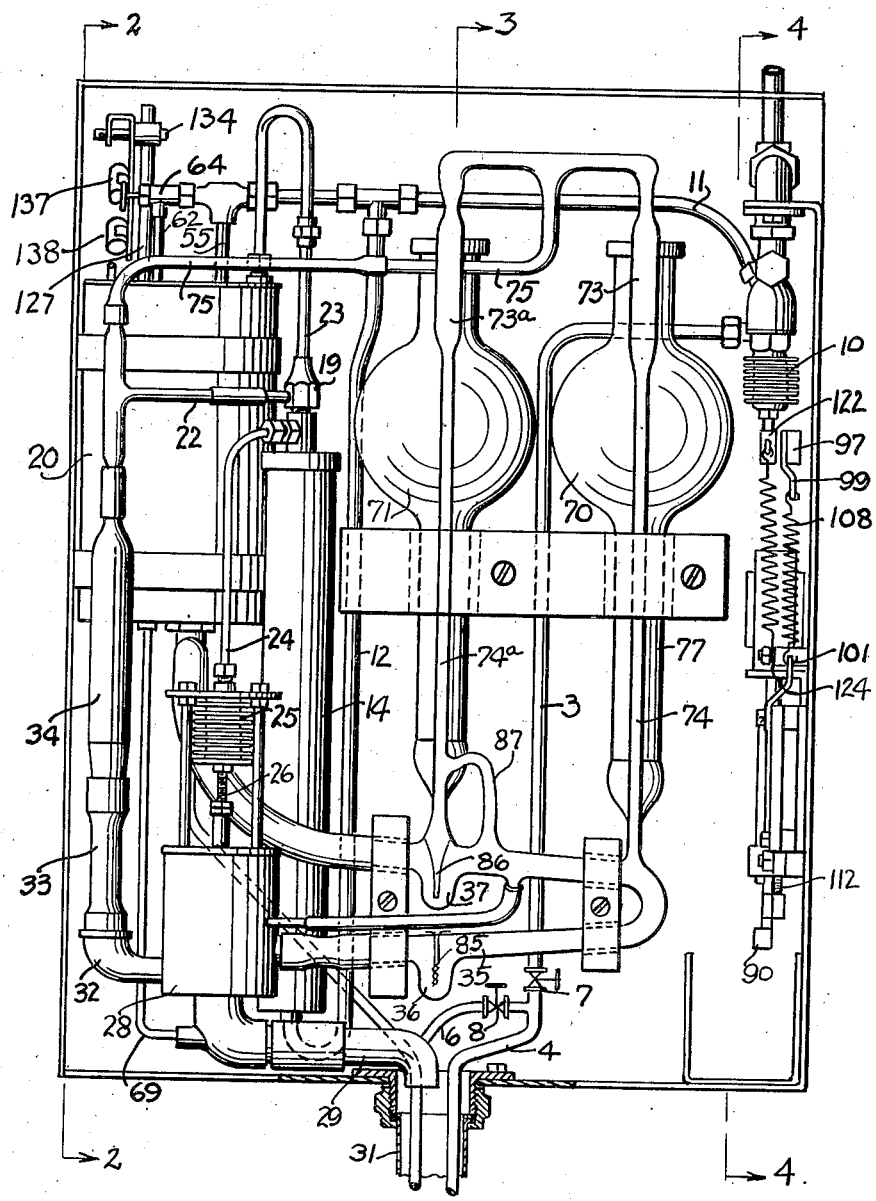
Fig. 1 is a front elevation of the principal operating parts of the mechanism.
Figure 2:
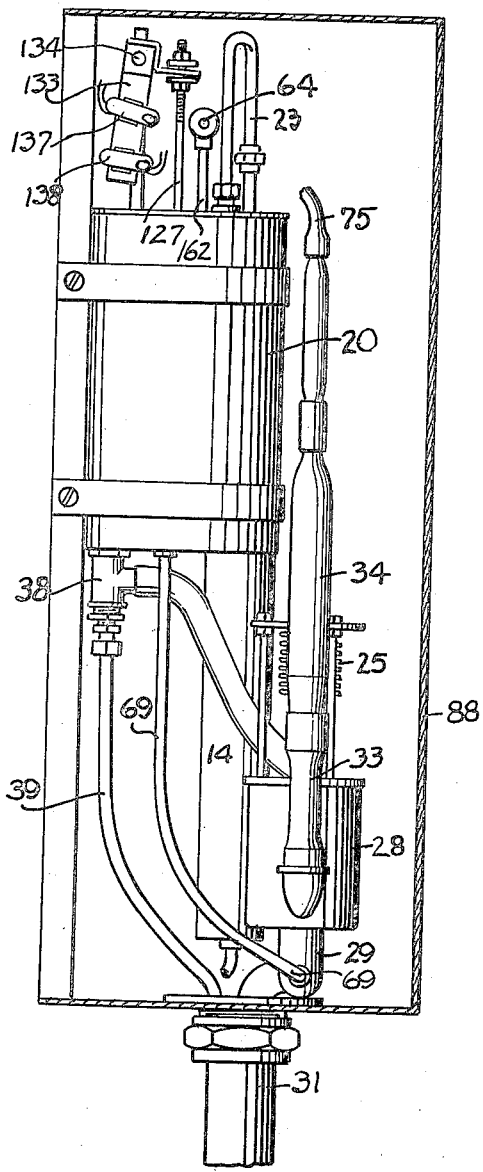
Fig. 2 is a side elevation of the mechanism taken at right angles to the view shown in Fig. 1, the housing for the apparatus being in section, approximately on the plane 2—2 of Fig. 1.

The chamber 28 has at its lower end an outlet pipe 29. The upper end of this pipe is flattened to form a seat at 30 for the valve 27. This valve is held normally open by the resiliency of the sylphon element 25 but when said sylphon element is extended longitudinally by the fluid pressure the valve 27 will close the passage 29, which leads to the drain or outlet pipe shown at 31 in Figs 1, 2 and 3. This movement will also close the vent around the rod 26 as previously noted.

The chamber 28 has a lateral opening toward the lower end thereof connected at 32 with the pipe 33, which in turn is connected by means of a transparent tube 34 with the pipe 22 previously referred to. It will be noted that a suction through the pipe 22 will tend to draw fluid therethrough from the chamber 28 in the direction of the injector.

On the opposite side of the chamber 28 is connected a pipe 35. This pipe forms a passage for liquid and a portion of this pipe is made of glass or other transparent material and, as will be seen from Fig. 14, said pipe has a depression 36 therein forming a bulb into which may be received a sample of urine to be tested. This pipe is recurved and above the bulb 36 is a second bulb 37, which is also to receive a sample of the urine to be tested. Beyond the bulb 37 the pipe is connected to a T 38, one end of which projects into the control chamber 20 and the other end of which is connected by the pipe 39 to the urine receptacle, as will be seen in Fig. 9. The lower end of the pipe 39 extends through the tube or outlet 31 and has its lower end terminating within the cup 40.

It will be noted that the cup 40 is mounted at the lower end of a rod 41, the upper end of which is extended into a cylinder 5. Within this cylinder and mounted upon the rod 41 is a piston 43 and it will be seen that the upper end of the cylinder has connection at 44 with the water tube 4, so that when the water flows in through the pipe 4 it will act upon the piston 43 within the cylinder 5, tending to force the rod 41 downwardly and move the cup 40 away from a position closing the opening 45 in the housing 46 about the cylinder. Within the cylinder 5 is a coil spring 47 which bears at its lower end upon a plug 48 closing the lower end of the cylinder and at its upper end bears against the piston, tending to hold the piston in raised position. About the rod and toward the lower end of the cylinder is a sleeve 49, which tends to limit the downward movement of the piston.

It will be noted that the housing 46 about the cylinder is connected directly to the lower end of the tubing 31. There is a swaged nipple 50 connected with the tubing 31 and extending downwardly and connected with a skirt 51 which extends a short distance down along the outer surface of the housing to discharge water passing out through the tube downwardly along the housing, said water entering the space outside the housing through openings 52 in the side of the tube 31 and below the nipple 50.

There is a syphon tube 33 extending downwardly along the outer side of the housing at the lower end thereof and having the small arm of the syphon tube extending downwardly into the cup 40. This tube forms an outlet from the cup whereby the device may be flushed clear after a test has been made. To prevent the liquid passing downwardly outside the housing 46 from entering the opening 45 I may provide an arcuate trough 54 on the tube about the opening to deflect the liquid away therefrom.

Water flowing through the pipes 11 and 13 may enter by way of the branch 55 into the upper end of a cylindrical chamber 56 which is housed in the upper portion of the control chamber 20. Below the inlet to this chamber is a piston 57 connected by means of the rod 58 to a valve 59, which when moved downwardly will seat at 60 on the upper end of the T 38 previously noted. There is a spring 61 below the piston and bearing on the lower end of the chamber which tends to hold the piston upwardly with the valve 59 in open position. Fluid entering through the branch 55 will depress the piston and close the valve. Water not passing out through the line 55 may pass through the branch 62 into the upper end of the cup-shaped cylinder 63 within the housing. I have a valve 64 in this branch by means of which the passage of liquid through the branch 62 may be regulated.

The water entering control chamber 20 through this pipe 62 fills the cup 63 and overflows into the control chamber which is gradually filled thereby. The cup-shaped cylinder 63 is formed with a lateral opening 65 near its upper end to allow the overflow of liquid therefrom. A sleeve valve 66 around the cylinder may be adjusted vertically to regulate the height of the opening 65 and thus determine the level of liquid which may rise within the cup 63. This sleeve valve may be adjusted by means of a valve stem 67 extending through the upper wall of the chamber and having an adjusting nut 68 thereon.

Within the cylinder 63 is the overflow pipe 69, from which fluid in the cylinder 63 may find an outlet to the drain pipe 29, as will be seen in the drawings.

In order to deliver a testing liquid to the urine delivered into the bulbs 36 and 37, previously described, I have provided two containers 70 and 71. These containers are preferably glass flasks and are connected by means of tubes 72 and 72a to chambers 73 and 73a, respectively, which deliver the test liquid through pipes 74 and 74a to the bulbs 36 and 37, respectively.

Figure 3:
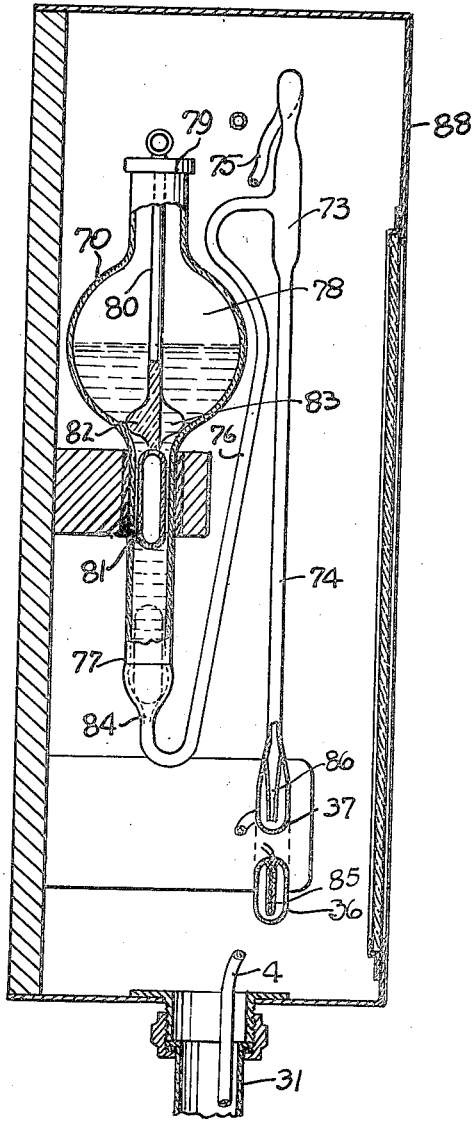
Fig. 3 is a central longitudinal section along the plane 3—3 of Fig. 1.
Figure 5:
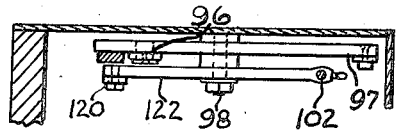
Fig. 5 is a broken section taken on the plane 5—5 of Fig. 4 and illustrating the operating levers.
Figure 6:
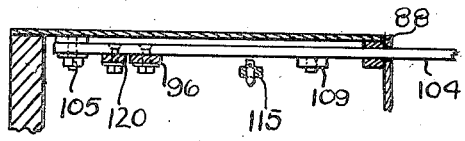
Fig. 6 is a similar section taken on the plane 6—6 of Fig. 4.
Figure 7:
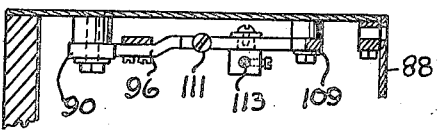
Fig. 7 is a still further section taken on the plane 7—7 of Fig. 4.

The apparatus by means of which this flow of test liquid is delivered to the bulbs will now be considered. Due to the action of the aspirator 19 the suction is exerted through the pipe 22 and through the upwardly extending branch 75 to chambers 73 and 73a. Referring now to Fig. 3, it will be noted that the suction in the pipe 75 will tend to draw liquid up through the branch pipe 76 which leads to the lower end of the flask 70 or 71. This flask is formed with a cylindrical lower stem 77 and an upper containing chamber 78, in which the proper test liquid is placed. The upper end of the flask has a cap or stopper 79 below which is the stem 80, which furnishes a stop for a float valve 81. The lower end of the stem 80 has an enlarged end 82 thereon resting on the lower end of the container and having passages 83 therethrough to allow the free flow of liquid downwardly into the lower measuring chamber 77. The valve 81 is cylindrical in shape and fits loosely within the lower measuring chamber 77 and when moved downwardly, due to suction exerted through the tube 76, will tend to close the lower end 84 and prevent the outward delivery of any more of the test liquid. Thus it will be seen that the suction exerted through the pipe 76 will draw from the container the amount of liquid below the valve in the lower chamber 77 of the container. When this amount has passed from the flask the valve will close and prevent the passage of any more of the test liquid.

The liquid thus drawn from the flask will be delivered into the chambers 73 and 73a, the lower end of which is somewhat constricted, allowing the liquid to drain through the pipes 74 and 74a to the bulb somewhat slowly at the proper time.

The liquid contained in the flask 70 is preferably Benedict's solution, although, as will be later noted, other solutions may be used. This liquid is a blue liquid and will be delivered through the pipe 74 and around the bend in the pipe 35 and to the bulb 36. Within the bulb 36 is an electrical resistance element 85 by means of which the mixture of the test liquid and urine in the bulb 36 may be heated up, as will be later noted.

The liquid in the flask 71 may be any of several desired reagents which may be employed for the albumin test. Nitric acid is commonly employed although other reagents may be substituted. The acid will be delivered from the flask through the tube 74a in the manner described and will flow directly downward through a nozzle 86 to the lower end of the bulb and will, because of its greater specific gravity, lie below the urine, leaving a line of demarcation between the acid and the urine which, if albumin is present, will begin to turn white. I have shown the small branch pipe 87, which forms a bypass past the bulb 37, for air in the test liquid flowing down through the tube 74a.

It will be obvious that the test liquid must not be delivered to the bulbs until the urine has stopped flowing through tube 35. This is accomplished by the relative arrangement of the urine and test liquid apparatus. The urine tends to rise in the suction pipe into the glass pipe 34. The suction exerted through pipe 75 and into the flasks is strong enough, in contrast, to suck air up through the pipes 74 and 74a, the bubbles of which will prevent the test liquid from flowing down from chambers 73 and 73a until the suction is cut off. The test liquid will then flow down into the urine-containing bulbs without hindrance.

The mechanism by which the device may be operated may now be considered. Referring particularly to Figs. 1, and 4 to 8, inclusive, it will be seen that the apparatus is enclosed within a housing 88. Toward the lower part of the housing is a coin-controlled slide plate 89, the exact construction of which is not material, it being understood, however, that when a coin is inserted above the slide the slide plate may be pushed inwardly to advance the arm 93 to contact with a dog 90 pivoted at its upper end at 91. Said dog has a downwardly presented shoulder 92 below which is engaged a finger 94 upon an arm 95 secured at the lower end of a sliding bar 96. Thus when the slide plate is moved inwardly to contact with the dog 90 and swing it on its pivot 91 away from the finger 94 the arm 95 will be free to move upwardly.

The slide bar is secured at its upper end to the lever arm 97, which is pivoted at an intermediate point at 98 to a post fixed in the side wall of the housing. The forward end of said lever has secured thereto a downwardly extending finger 99 to which is attached a tension spring 100. Said spring is secured at its lower end 101 to a bracket fixed to the housing. This spring tends to hold the forward end of the lever 97 downwardly and exerts an upward pull upon the slide bar 96.

To the lever arm 97 is secured a valve engaging member 102 adapted to engage the stem of valve 2, and it will be seen that when the lever arm 97 is pulled downwardly by the spring the member 102 will engage the stem of the valve 2 and push it inwardly to open position, and allow the flow of fluid through the pipe 3. The valve may thus be opened by moving the coin control side inwardly so as to move the dog 90 and allow the arm 95 to be moved upwardly under the tension of the spring 100.

Above the coin-controlled slide plate is a hand operated lever 104. This lever extends through the box and is pivoted at 105 adjacent the rearward side of the housing. The lever is limited in its upward movement by engagement at 106 with the upper end of the slot in which it moves. Said lever has a laterally extending pin 107 thereon which engages within a notch 108 in the upwardly extending arm of a bell crank lever 109. Said bell crank lever is pivoted at 110 to a post in the wall of the housing and extends rearwardly therefrom. It has an adjusting set screw 111 toward the end thereof which is adapted to engage the arm 95 previously noted. Fixed on the lower arm of the bell crank lever is the post 112 through which extends the lower end of a rod 113. Said rod may be fixed in adjusted position to the post 112 by a set screw 114. The upper end of the rod 113 is connected to the lower end of a core 115 of a solenoid 116.

Extending laterally from the lever 104 is another post 117, which projects through a slot 118 in the slide bar 96. This engagement of the post 117 in the slot in the slide bar allows said bar to slide upwardly a limited amount relative to the lever 104, but still enables the operator to move the slide bar by a further movement thereof beyond the limits of the slot 118.

Upon the lever arm 104 at the inner side of the post 117 is a pin 119 to which is connected a link 120 which extends upwardly and is connected at 121 with a lever arm 122. Said lever arm is pivoted upon the post 98 previously noted and at its forward end is attached an eyelet 123, to which is attached a tension spring 124. Said spring is connected at its lower end to the wall of the housing at 125 and exerts a continued tension upon the end of the lever 122.

Upon the lever 122 adjacent the forward end thereof is a set screw 103, which is adjustable through the forward arm of the lever and extends into contact with the stem 126 of the valve 10. Thus when a downward pull is exerted upon the link 120 to move the inner end of the lever 122 downwardly an upward thrust is exerted against the stem of the valve 10 to open the same.

With reference particularly to Fig. 14, the electrical connections employed with this invention and the operating mechanism connected thereto may now be noted. Within the control chamber 20 is a switch-operating rod 127. Said rod extends through the upper wall of the control chamber and at its lower end is fitted within a guide sleeve 128 extending from the lower wall of the chamber. Fixed upon this rod is a lower stop collar 129 and an upper stop collar 130. Below the stop collar 129 is a float 131 slidable along the rod and adapted to be raised to contact with the stop collar 129 by the filling up of liquid in the control chamber. Above the stop collar 129 is the float 132, which is also slidable on the rod. When raised upwardly by the rise of the liquid level in the chamber so as to contact with the stop collar 130 it will raise the rod still further.

Attached to the upper end of the rod and above the control chamber is a switch comprising an arm 133 which is pivotally mounted upon the post 134 in the frame of the housing. A laterally extending arm or plate 135 on the upper end of the arm 130 is formed with an opening therein to receive the upper end of the rod 127. Two spaced adjusting nuts 136 on the rod allow for movement of the arm 135 to swing the switch arm 133.

Mounted upon the arm 133 are two mercury tube switch members 137 and 138. The tube 137 is mounted upon the arm 133 at an angle with the contact poles 139 thereon toward the upper end of the tube so that when the arm 133 is in normal position, as shown, the mercury is on the end away from the poles of the electric circuit. The lower switch member 138 is also mounted at a slight angle relative to the arm but with the poles of the circuit 140 on the downward end of the tube normally closing the circuit through the poles 140.

In Fig. 13 is a diagram illustrating the wiring of the device. The two conductors 141 and 142 are to be understood as being connected with some source of electricity such as the usual domestic wiring system. The line 142 has connected therein a line 143, which has a manually operated switch 144 therein, which may be understood as operated when the lever 104 is pulled downward, as will be later explained. When the switch is closed to connect with the conductor 145, the remainder of the system is brought into the circuit. Connected between the conductor 145 and the conductor 141 is the solenoid 116, previously referred to, and the switch member 137. There is a branch circuit from the line 141 passing by wire 146 through the light bulb 147 which is to be understood as being mounted in the frame of the device to the rear of the test bulbs.

In the line 145 is also the heating element 85 within the test bulb 36 previously noted. I may employ a resistance 148 in this line leading through the poles 139 of the switch 137, and from thence back to the line 141. It is also to be noted that there is a light bulb 149 connected in the circuit which will be mounted toward the upper portion of the housing so as to illuminate the interior thereof when the device is not in operation.

Figure 4:
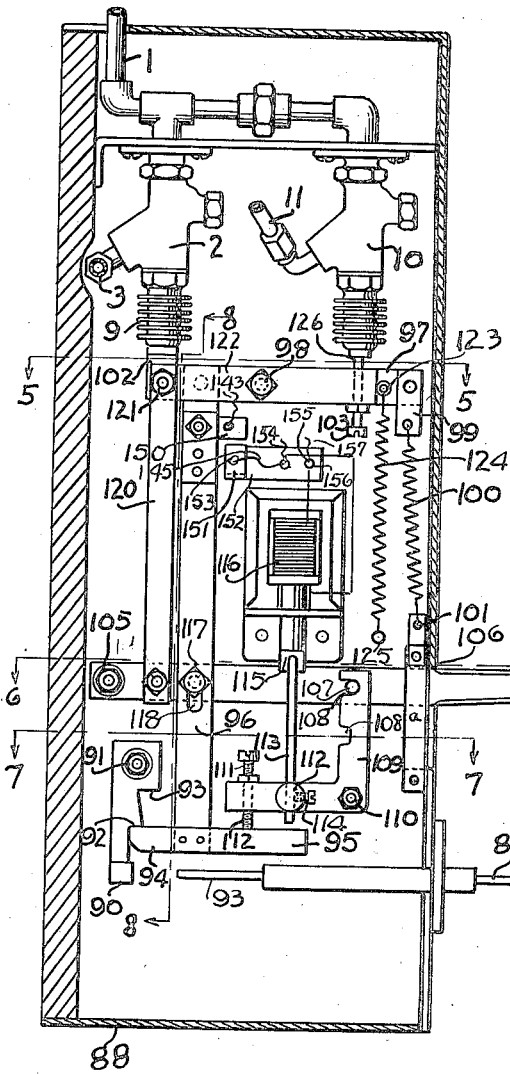
Fig. 4 is a similar longitudinal section taken on the plane 4—4 of Fig. 1.
Figure 8:
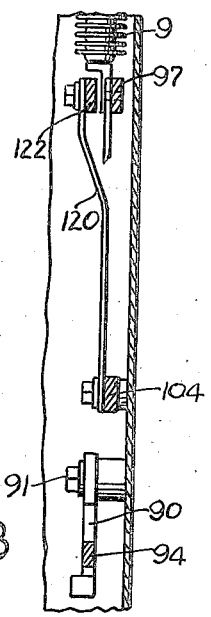
Fig. 8 is a broken section along the plane 8—8 of Fig. 4.

The connections in this circuit of the solenoid mentioned relative to Fig. 4 may now be noted. Upon the slide bar 96 is a laterally extending knife switch member 150 to which is connected the conductor 146 in the main circuit. This arm when moved downwardly with the slide bar 96 will engage with the plate 151 mounted upon the support 152 in the housing. Mounted on the switch member 151 is a post 153 connected by the wire 154 to the post 155 and from thence to the wire 145 in the circuit as shown in Fig. 13. There is also a post adjacent thereto shown at 156, which is connected in the circuit with the solenoid as shown at 157 in Fig. 13. This post is also connected directly to the solenoid and the post 155 is connected to the other end of the solenoid, as will be seen in Fig. 4.

In the operation of the device the operating levers are positioned as shown in Figs. 4 to 8, inclusive. To open the receptacle for the urine a coin is dropped in the upper portion of the slide 89 so that when said slide is moved inwardly it will push the rod to engage the dog 90 and by moving it laterally release the finger 94 and allow the spring 100 to move the draw bar 96 upwardly. The said bar 96 may move upwardly relative to the lever 104 through the elongated slot 118 therein which permits sufficient movement upwardly of this draw bar to move the lever 97 and exert an upward thrust against the stem of the valve 2 and move it to open position. The valve 2 being open will allow water to be delivered from the pipe 1 through the pipe 3 past the valve 7 and through the pipe 4 and force the piston 43, shown in Fig. 9, downwardly so as to move the cup 40 below the opening 45. The urine may then be deposited in the cup 40 and the lever 104 may then be operated. It will be seen that the cup 40 will remain in its open position so long as the pressure of water is exerted in the line 4 holding the piston 49 downwardly, but when the pressure is released in this line the spring 47 will automatically move the cup 40 to closed position.

The next step is performed by moving the lever 104 downwardly. It is to be noted that the lever 104 is locked in closed position but when the slide bar 96 is moved upwardly the arm 45 thereon engages the screw 112 and moves the horizontal arm of the bell crank lever upwardly. This throws the notch 108 in the other arm of the lever to the right releasing the pin 107 so that the lever 104 may be moved downwardly so as to engage within the notch 108a.

When the arm 104 is moved downwardly it will exert a pull upon the link 120 thus pulling the end of the lever 122 downwardly and moving the other end upwardly so as to bring the pin 103 against the valve stem 126 and move it upward to open position against the tension of the spring 124. The lever 104 will remain in its lower position latched by the engagement of the pin 107 in the notch 108a of the bell crank lever.

It is to be noted that when the lever 104 is moved downwardly it will move the slide bar 96 downwardly so as to allow the valve 2 to close. This will result in the moving of the urine receptacle 40 to closed position with the pipe 39 extending downwardly to a position adjacent the lower end of the cup.

The opening of the valve 10 will cause a flow through the pipe 11 and through the branch 12 to the lower end of the cylinder 14 and will tend to move the valve 17 slowly upwardly in the cylinder so that said valve will eventually close the opening 18. This movement may be timed by varying the length of the cylinder 14 and also by the size of the opening 16 through the valve. It will be adjusted so that the valve 18 will not be closed until the necessary operations have been completed.

The liquid passing from the cylinder 14 through the outlet 18 will issue through the nozzle 21 and actuate the aspirator 19 and thus exert a suction through the pipe 22. The liquid passing the aspirator will flow through the pipe 23 to the upper end of the control chamber 20.

By causing a suction in the pipe 22 a suction will be exerted through both branches connected with said pipe 22, that is, through the pipe 34 and the pipe 75. The pipe 34 being connected with the lower end of the chamber 28 will cause a suction therein which causes said chamber 28 to become a so-called suction chamber. The lower outlet 30 from this chamber will have been closed.

The closing of the valve 27 results from the passage of the liquid from the cylinder 14 through the pipe 24 to the expansion element 25 which moves the valve rod 26 downwardly and closes the valve and holds the same in closed position during the movement of the liquid from the cylinder 14.

The outlet 30 being closed the suction in the chamber 28 is exerted through the pipe 25 and around the bend therein and back up to the T 38. At this time the valve 59 will have closed the opening 60, as will be later noted, and the suction will hence be exerted through the line 39 down to the urine receptacle, as shown in Fig. 9, and suck the urine from the receptacle through the line as just described. As the urine flows through the line 35 some will be deposited in the cup or bulb 37 and some deposited in the bulb 36. The rest of the charge being carried along and deposited in the suction chamber 28, from which it will later be allowed to flow through the outlet 29 to the drain. It will be understood that there is a large excess of urine necessary to fill the two bulbs 36 and 37 and this excess will flow along out toward the drain as noted.

The suction exerted through the line 75 will operate the discharge of testing liquid from the two flasks 70 and 71. The suction in the chambers 73 and 73a will be exerted through the tubes 72 and 72a to the lower ends of the flasks. With reference particularly to Fig. 3, it will be seen that the measured amount of testing liquid below the valve 81 will be drawn out of the lower end of the flask by this suction before the valve 81 closes off the passage of a further amount of testing liquid from the flask. The amount which is thus drawn from the flask is retained temporarily in the chamber 73 until the aspirator has been cut off and will then pass on to the test bulbs, and in the case of the flask 70 containing the Benedict solution, the liquid will run around the bend in the pipe 35 and mix with the urine in the bulb 36. The excess of mixed liquid will drain down the pipe 35 to the suction chamber 28. The acid from the flask 71 will be delivered through the nozzle 86 to the lower end of the bulb 37 and settle in the lower portion of the bulb. The valve 17 will close the opening 18 and shut off the action of the aspirator after a predetermined time has elapsed and when the suction is thus shut off from the test liquid line the liquid will be released to flow to the bulbs as previously described. The flow of liquid through the line 24 will also be stopped so as to allow the valve 27 to open and discharge the liquid therefrom. When suction exerted through the line 75 to the two flasks is released the valve 81 therein will rise into contact with the stop pin 80 and during this movement another charge of test liquid will fill the cylindrical chamber in the lower end of the flask.

The flow of liquid through the pipe 11 will also be delivered through the branch 13 to the pipes 55 and 62. That passing through the pipe 55 will close the valve 59 in an obvious manner; that passing through the line 62 will be delivered into the cylinder cup 63 and will overflow therefrom into the control chamber 20 at the rate regulated by the height of the sleeve valve 66. The liquid thus overflowing will gradually fill the control chamber up to the level of the upper end of the discharge pipe 69. The liquid will first act on the float 131, raising it against the stop collar 29 and tending to move the valve rod 127 upwardly. It is to be noted that the switch arm 133 is normally inclined away from the vertical but the movement of the rod through the float 131 will be sufficient to move the arm so that it will hang in a vertical position moving the mercury away from the contact poles 160 and open the circuit through the wires connected therewith.

The continued filling of the chamber will move the float 132 into contact with the stop collar 130 and the two floats close together will thus be able to swing the arm 133 further to the right and away from the vertical, sufficiently to close the circuit through the wires 139 so as to actuate the solenoid 116 and move the core and the rod 113 upwardly to disengage the notch 108 in the bell crank lever from the pin 107 and allow the lever arm to be pulled up to inoperative position where it will be engaged by the notch 108, thus latching the device in inoperative position. The movement of the arm is accomplished by the spring 124 as previously noted.

With reference particularly to Fig. 13, the operation of the switches 137 and 138 will be more clearly understood. The circuit through the wires 141 and 142 will include the light bulb 149, which is normally energized so as to light the interior of the housing. When the switch 138 is moved so as to open the circuit through the wires 140, this light will be turned off.

The switch at 144 is the knife switch formed by the parts 150 and 151 shown in Fig. 4, and this circuit is hence closed when the lever 104 is pulled downwardly. This initiates the operations of elevating and delivering the urine and the discharge of the test liquid thereto, as described. The heating element 85 which is extended into the upper portion of the bulb 36 will heat up liquid therein until the current is turned off by opening the switch 138. This heating of the charge in the bulb 36 will be strongest in the upper portion of the bulb and the charge will hence be most marked at that point and will there indicate the presence of sugar in the urine and if sugar is present the charge will turn from blue to green and from green to yellow, and if an excess of sugar is in the charge it will turn gradually red. As the upper portion will change while the lower unheated portion will remain blue a better comparison can be made. When heating is completed the movement of the float rod 127 will open the switch 138 and thus turn off the light 149. The current passing through the wire 146 will light the bulb 147, which is to be understood as being located toward the lower part of the housing and to the rear of the test bulbs 36 and 37. When the control chamber has filled with liquid sufficiently to move the rod 127 to close the switch 137 the solenoid 116 will be actuated to move the bell crank lever 109, releasing the pin 107 from the notch 108a and allowing the spring 124 to return the lever 104 to its upper or closed position.

When the operating lever is moved to closed position the valve 10 will be closed and the flow of liquid through the system will be entirely shut off. The release of pressure through the line 13 to the cylinder 46 will allow the piston 57 to be moved upwardly by the spring opening the valve 59 and allowing the liquid therein to flow outwardly and flush the system of pipes connected therewith including the line 35 and the line 39. This water will wash out the bulbs and the lines together with the suction chamber 28 and will pass out through the pipe 29 to the sewer. The water discharging through the pipe 39 will be delivered downwardly into the urine receptacle and will wash out the cup 40 and be syphoned out through the pipe 33 to the sewer. The water discharging through the pipe 29 will flow down through the pipe 31 and will issue through the openings 52 and through the skirt 51 downwardly along the outer portion of the pipe 56 and wash the same clear as will be understood. When the pressure is released in the cylinder 14 the valve 17 will gradually drop by its own weight to the lower end of the cylinder ready for the next operation of the device.

It will be seen that with this apparatus it will be possible for any person to make a urine test which will be accurate and give him reliable information relative to the presence of sugar or albumin at a very small cost and in a very short period of time. This apparatus is simple in its construction so that it will not get out of order by continued use. It is capable of being installed in a small housing and connected with a public urinal, as shown in Fig. 12, and be thus convenient to use.

Figure 15:
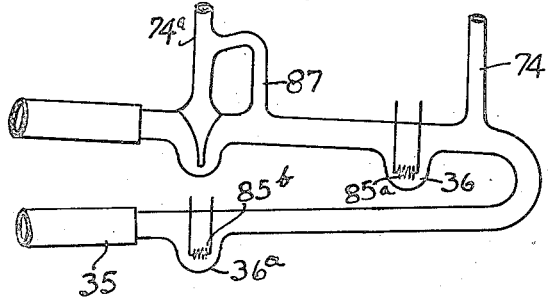
Fig. 15 is a broken view illustrating a slightly different manner of showing the presence of sugar in the urine.
Figure 16:
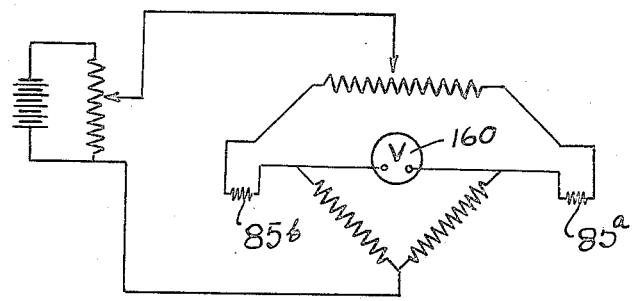
Fig. 16 shows the electrical connections for use with the device shown in Fig. 15.

While I have considered particularly the use of Benedict's solution as a testing liquid for sugar, I have shown in Figs. 15 to 16, inclusive, other means for indicating the presence of sugar. Thus, in Fig. 15, it will be seen that there are two separate bulbs 36 and 36a for the reception of urine. The bulb 36 is placed upstream from the discharge pipe 74 for the testing liquid and will receive none of the test liquid. It will, therefore, pass around the bend in the line 35 and be deposited in the bulb 36a. The test liquid which is employed in this instance may be a test liquid sometimes used, the principal ingredients of which are sodium carbonate and potassium permanganate. The action of this test liquid on another liquid containing sugar will be to cause a heating up of the liquid in proportion to the amount of sugar therein. I therefore have resistance elements 85a and 85b in the bulbs 36 and 36a, respectively, through which an electric current is adapted to pass. It will be understood that the current will pass more readily through an unheated wire than through one which is heated. Thus the element 85a will be at normal atmospheric temperature while the element 85a will be at the temperature of the liquid in the bulb 36a which will rise in case sugar is present when the test liquid is delivered thereto.

These two elements 85a and 85b are connected in a circuit as shown in Fig. 16 whereby a difference in the amount of current flowing through the two elements will be measured on an indicator such as the volt meter 160. It will be understood that the amount of heat developed due to the sugar in the urine will decrease the proportional amount of current flowing through the element 85b and the movement of the indicator will therefore give a very accurate showing of the amount of sugar in the urine being tested.

Figure 17:
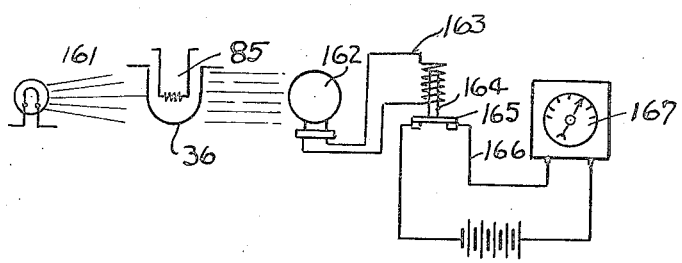
Fig. 17 is a diagrammatic view illustrating a still different way of testing for sugar.

In the arrangement shown in Fig. 17 a test liquid ordinarily called Nylander's reagent is employed. When this reagent is mixed with urine containing sugar the mixture will be turned black. If a small amount of sugar is present it will simply gray the charge of urine but the charge becomes proportionately blacker as the amount of sugar increases. By using this liquid in the bulb 36 in the arrangement shown in Fig. 14, I am enabled through the heating of the charge by means of the heating element 85 to gradually decrease the amount of light which may pass through the bulb 36, the length of time required to reach a given degree of opaqueness depending upon the amount of sugar in the charge. Thus a light placed at 161 may pass through the test bulb and actuate a light-sensitive instrument 162 such as a selenium cell. This cell will be actuated to cause a current to flow through the circuit 163 and by moving the relay 164 control the flow of current in the arm 165 connected therewith, said arm being placed within an electric circuit 166 having therein a clock-operated indicator 167. This indicator will thus be actuated when the light and the heater are energized to move the indicator arm and, when the light is completely shut off by the turning of the charge to an opaque condition, the indicator will stop. The time taken to turn the charge opaque will indicate the proportional amount of sugar present.

It should be understood that the time required is inversely proportional to the percentage of sugar, the movement of the indicator being from the maximum toward the minimum position with the point at which it stops as the percentage of sugar measured.

It will be understood, therefore, that in the making of the various tests connected with my device numerous reagents may be employed in making the test and various types of indicators actuated through the amount of sugar in the sample may be visibly displayed so that the operator can get a fairly accurate idea of the percentage of sugar present.

What is claimed as new is:

1. In a urine testing device, a plurality of water conducting pipes, valves controlling the flow of liquid therein, a suction chamber, a urine receptacle, a pipe for conducting urine from said receptacle to said suction chamber, a plurality of test bulbs in said pipe, means actuated by the flow of water in one of said pipes to create a suction in said suction chamber and cause a flow of urine from said receptacle to said bulbs and from thence to said chamber, an outlet from said suction chamber, means to operate said valves, and means to normally open said outlet.

2. In a urine testing device, a plurality of water conducting pipes, valves controlling the flow of a liquid therein, a suction chamber, a urine receptacle, a pipe for conducting urine from said receptacle to said suction chamber, a plurality of test bulbs in said pipe, means actuated by the flow of water in one of said pipes to create a suction in said suction chamber and cause a flow of urine from said receptacle to said bulbs and from thence to said chamber, an outlet from said suction chamber, means to operate said valves, means to normally open said outlet, and means to deliver testing fluid to said bulbs actuated by said suction creating means.

3. In a urine testing device, a plurality of water conducting tubes, valves controlling the flow of liquid in said pipes, a urine receptacle, a suction chamber, a passage from said chamber to said receptacle, an aspirator operating in response to the flow of liquid in one of said pipes to move urine from said receptacle through said passage to said chamber, bulbs in said passage to receive samples of said urine, means actuated by said aspirator to deliver testing fluid to each of said bulbs, means to heat one of said bulbs, and means to render said aspirator inoperative after a predetermined interval.

4. In a urine testing device, a plurality of water conducting tubes, valves controlling the flow of liquid in said pipes, a urine receptacle, a suction chamber, a passage from said chamber to said receptacle, an aspirator operating in response to the flow of liquid in one of said pipes to move urine from said receptacle through said passage to said chamber, bulbs in said passage to receive samples of said urine, means actuated by said aspirator to deliver testing fluid to each of said bulbs, means to heat one of said bulbs, means operative after a predetermined interval to close the passage of fluid to said aspirator and simultaneously open an outlet for liquid from said suction chamber.

5. In a urine-testing device, a tube having a lateral opening, a urine-receiving cup therein, means to hold said cup in position normally closing said opening, fluid pressure actuated means to move said cup below said opening, a plurality of test bulbs, means to pump the urine from said cup to said bulbs, test liquid flasks for said bulbs, means operating to deliver test liquid from said flasks to said bulbs, and means to heat one of said bulbs.

6. In a urine testing device, a tube having a lateral opening, a urine receiving cup in said tube and slidable longitudinally therein, means normally holding said cup in position closing said opening, fluid pressure actuated means to move said cup downwardly below said opening, a plurality of test tubes, means actuated when said cup is again moved to closed position to pump the urine from said cup to said bulbs, means operating to deliver test liquid to said bulbs, and means to heat one of said bulbs.

7. In a urine testing device, a urine receptacle, a suction chamber, an aspirator actuated by the flow of fluid therethrough to exert a suction in said suction chamber, a tube connecting said urine receptacle with said suction chamber, test bulbs in said tube, flasks for test liquid, a tube connecting said suction chamber with said flasks, passages leading from said flasks to said bulbs, the suction from said suction chamber acting to draw air upwardly through said tubes leading from said flasks, said test liquid being adapted to flow to said bulbs when said suction is discontinued.

8. In a urine testing device, a urine receptacle, a suction chamber, a fluid conducting passage from said receptacle to said chamber, test bulbs in said passage, flasks for test liquid above said bulbs, discharge lines from said flasks to said bulbs, a pipe connected with said suction chamber leading to the lower ends of said flasks, a cylindrical chamber at the lower end of each flask, a float piston at the upper end of said cylindrical chamber, acting when suction is exerted on said tube to move downwardly and close the lower end of the flask, the liquid below said piston being discharged into the line leading to said bulbs.

9. In a device of the character described, a plurality of test bulbs, means to deliver urine to said bulbs, a plurality of flasks for test liquid, a cylindrical chamber adjacent the lower end of each flask, a float piston in said chamber, means to hold said piston at a predetermined height in said cylindrical chamber, a tube leading from the lower end of one of said flasks to one of said bulbs, a second tube leading from another of said flasks to another of said bulbs, means to exert a suction to move liquid from below said piston to said tube, an enlarged chamber in said tube to temporarily retain said test liquid, and means to heat one of said bulbs.

10. In a device of the character described, a urine conducting pipe, a plurality of test bulbs therein, a plurality of flasks for test liquid, a measuring chamber in the lower end of each flask, float pistons at the upper ends of said chambers, a tube connecting one of said chambers with one of said bulbs, a second tube connecting another of said pipes to another of said bulbs, and means to exert a suction in said chambers to draw liquid from each of said flasks and deliver it to said chamber, said liquid being delivered to said bulbs when said suction is discontinued in the manner described.

11. In a device of the character described, a plurality of test bulbs, means to deliver urine to said bulbs, a plurality of flasks for test liquid, a cylindrical chamber adjacent the lower end of each flask, a float piston in said chamber, means to hold said piston at a predetermined height in said cylindrical chamber, a tube leading from the lower end of one of said flasks to one of said bulbs, a second tube leading from another of said flasks to another of said bulbs, means to exert a suction to move liquid from below said piston to said tube, an enlarged chamber in said tube to temporarily retain said test liquid, said suction means acting to cause an upward rise of air in said tube to said chamber, and means to heat one of said bulbs.

12. In a device of the character described, a urine conducting pipe forming a urine passage, a plurality of test bulbs therein, means to deliver urine to said bulbs, a plurality of flasks for test liquid, a measuring chamber in the lower end of each flask, float pistons at the upper ends of said chambers, a pipe connecting each of said chambers with said passage, and means to exert a suction in said pipe to draw liquid from each of said flasks and deliver it to said chamber in the manner described, said pistons acting to limit the amount of said liquid discharged, the suction in said pipe acting to prevent the passage of test liquid to said bulbs until said suction is discontinued.

13. A housing, liquid conducting pipes therein, a valve in each of said pipes, a urine receptacle, a plurality of test bulbs, means actuated by the flow of liquid in one of said pipes to open said receptacle, means actuated by the flow of liquid in another of said pipes to raise the liquid from the receptacle to said bulbs, manually operated means to open one of said valves, a manually operated lever, means actuated by the movement of said lever to open the second of said valves, means to latch said lever in open position, and electrically operated means actuated in response to the flow of liquid in one of said pipes to release said latch, and a spring to return said lever to closed position.

14. A housing, two liquid conducting pipes in said housing, valves controlling the flow of liquid in said pipes, coin controlled means to open the first of said valves, a lever to open the other of said valves, means to latch said lever in closed position releasable through the operation of said coin control means, means operated by the movement of said lever to open position to open said second valve and close said first valve, and electrically operated means operated a predetermined interval after said second valve is opened to release said lever, and means to move said lever to closed position.

15. In a device of the character described, a pair of liquid conducting lines, valves controlling the flow of liquid therein, an aspirator actuated by the flow of liquid through one of said pipes, a control chamber, a switch arm, two mercury contact switches on said arm, a rod connected with said arm, and extending into said control chamber, a plurality of floats on said rod, a plurality of stop collars on said rod adapted to be engaged by said floats to move said switch arm first into a vertical position and then into an inclined position relative to the vertical to open and close said switches, and means operated by the closing of one of said switches to close one of said valves.

16. In a device of the character described, a pair of water conducting pipes, valves controlling the flow of water therein, a plurality of test bulbs, a receptacle for urine, a passage from said receptacle to said bulbs, suction means operating in response to the flow of liquid in one of said pipes to move urine from said receptacle to said bulbs, flasks for test liquid, said suction means acting to draw a predetermined amount of test liquid from said flasks for delivery to said bulbs, means in said flasks to limit the amount of test liquid discharged, and means to operate said valves.

17. In a device of the character described, a pair of water conducting pipes, valves controlling the flow of water therein, a plurality of test bulbs, a receptacle for urine, a passage from said receptacle to said bulbs, suction means operating in response to the flow of liquid in one of said pipes to move urine from said receptacle to said bulbs, flasks for test liquid, said suction means acting to draw a predetermined amount of test liquid from said flasks for delivery to said bulbs, means in said flasks to limit the amount of test liquid discharged, said test liquid being released for delivery to said bulbs only after said suction means ceases to operate, and means to operate said valves.

18. In a device of the character described, a pair of water conducting pipes, valves controlling the flow of water therein, a plurality of test bulbs, a receptacle for urine, a passage from said receptacle to said bulbs, suction means operating in response to the flow of liquid in one of said pipes to move urine from said receptacle to said bulbs, flasks for test liquid, said suction means acting to draw a predetermined amount of test liquid from said flasks for delivery to said bulbs, an electrical heating unit in one of said bulbs extending into the upper portion thereof for heating said liquid, and means to operate said valves.

SAM P. WORDEN.